March 10, 1931. A. F. NASH 1,795,405
CRANE, DERRICK, SHEAR LEG, AND LIKE LIFTING DEVICE
Filed March 5, 1930 3 Sheets-Sheet 1
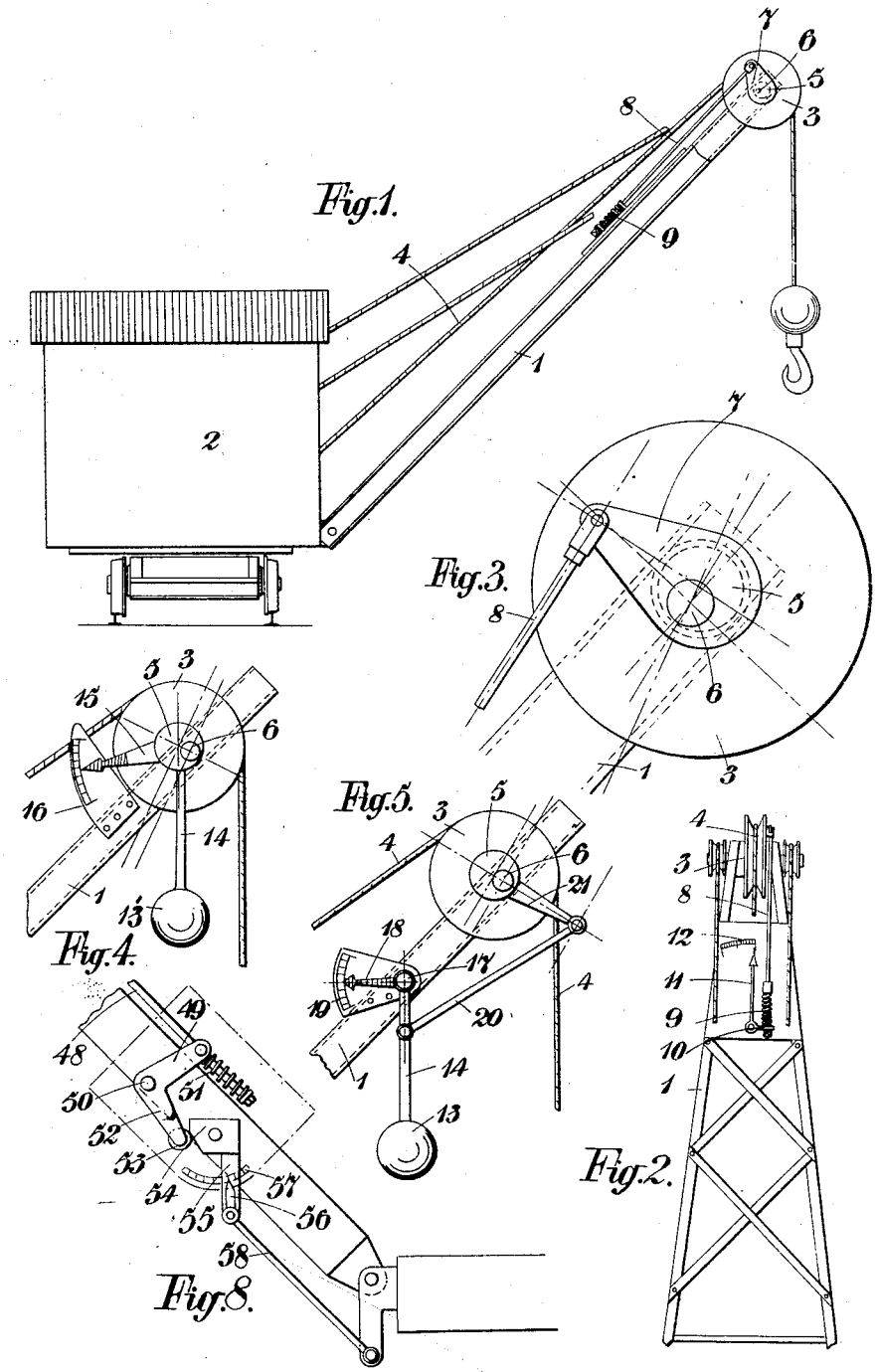

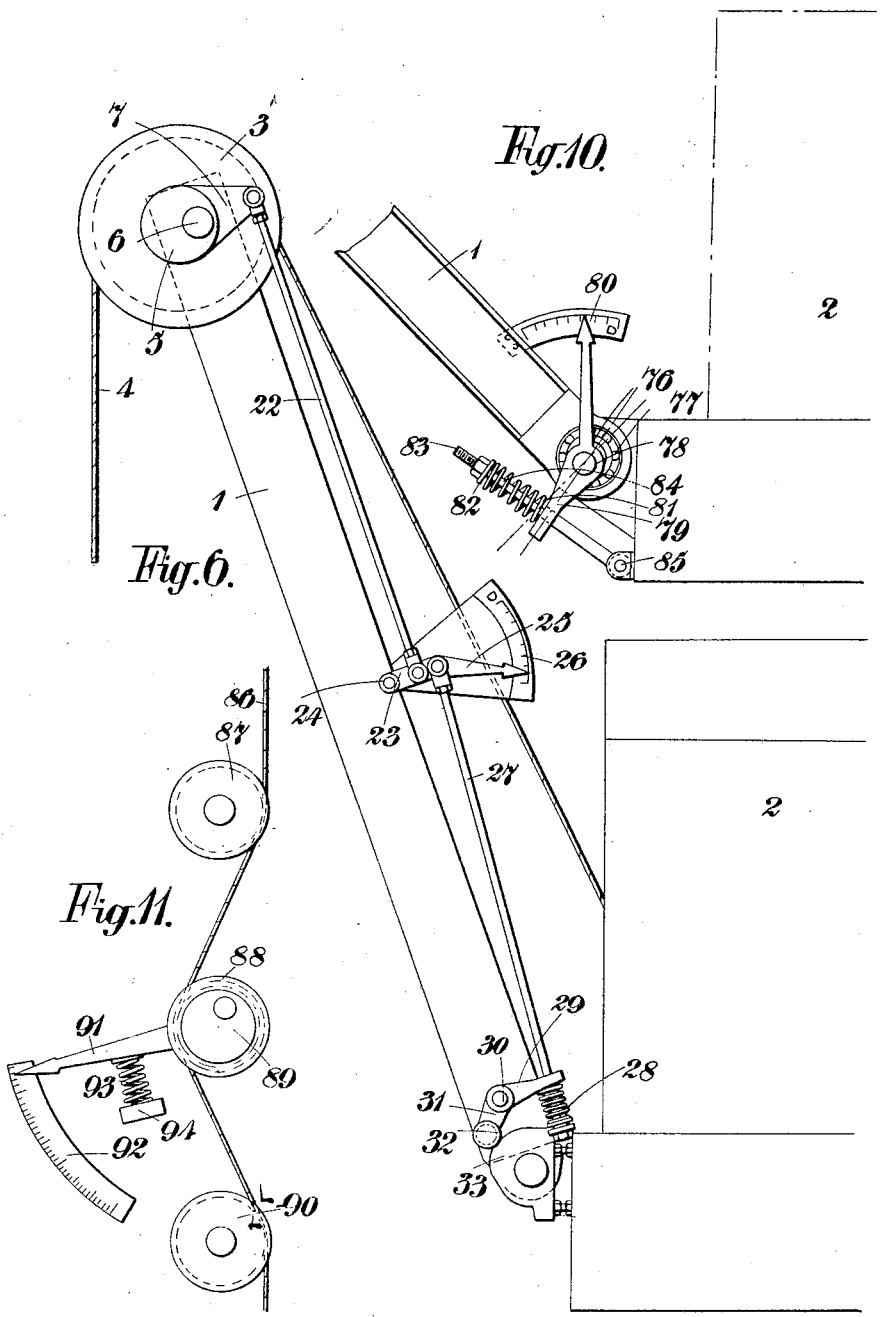

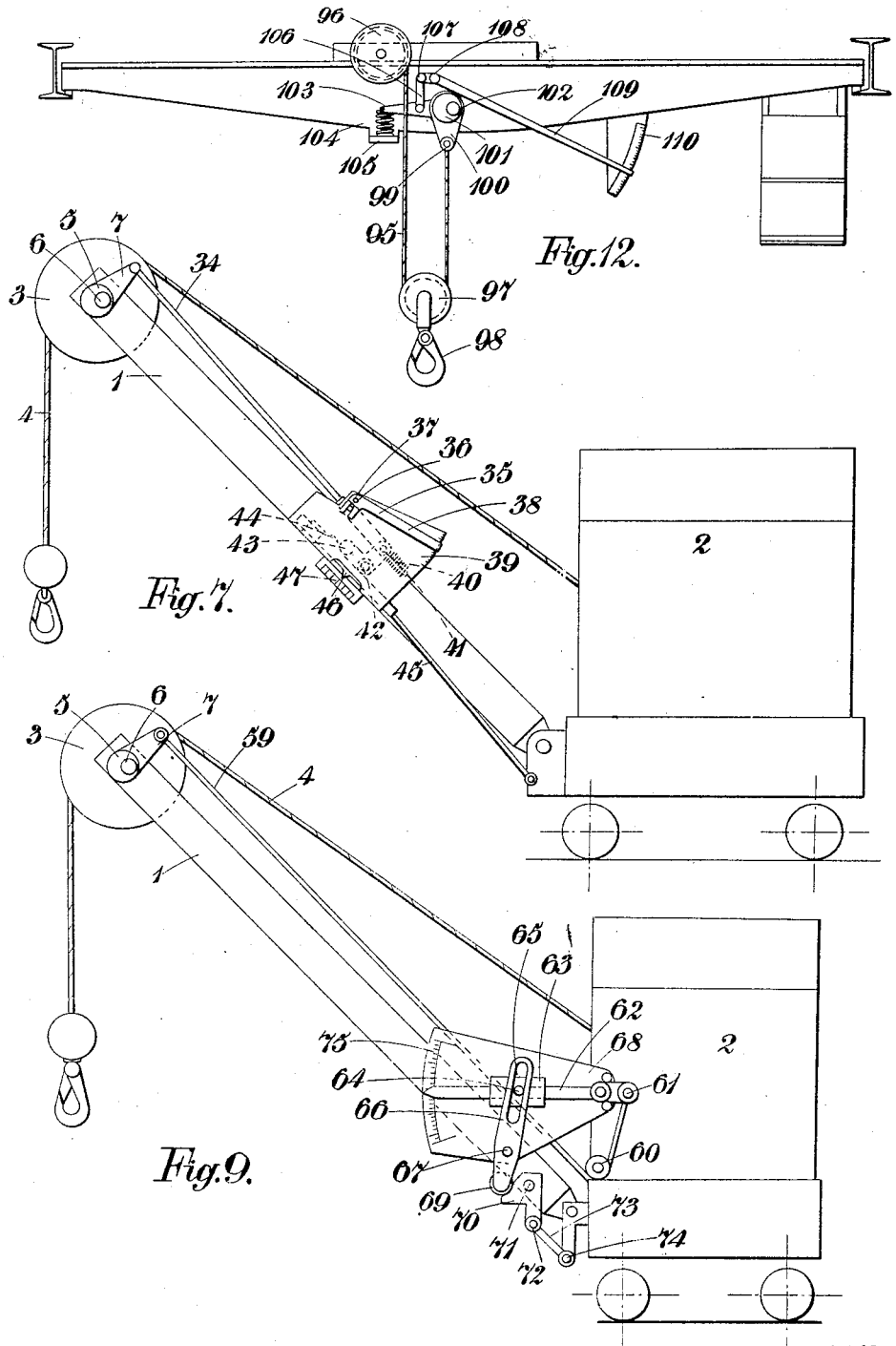

Patented Mar. 10, 1931

1,795,405

UNITED STATES PATENT OFFICE

ARCHIBALD FRAZER NASH, OF KINGSTON HILL, SURREY, ENGLAND

CRANE, DERRICK, SHEAR LEG, AND LIKE LIFTING DEVICE

Application filed March 5, 1930, Serial No. 433,435, and in Great Britain March 9, 1929.

This invention relates to cranes, derricks, shear-legs and other lifting devices.

The object of the invention is to provide improved means of the kind designed to determine the magnitude of the load which is being raised by the lifting device and which may thus function as a weigher or as means for preventing or avoiding over-loading and in such case optionally to take into account other factors than the weight of the load, for instance, in the case of a jib crane or derrick, the variations in the angle of inclination of the jib, the resistance to crushing of the jib or the like and the strength of other elements of the lifting device.

According to the invention a member subjected to the action of the load is rotatably mounted on an eccentric member with which is associated indicating means adapted to be influenced by the moment of the force acting on the eccentric member due to the load to indicate the magnitude thereof and optionally, alternatively or in addition operate to prevent, defer or interrupt the operation of the lifting device when the safe load is exceeded.

Conveniently, the rotatable member is mounted on a sleeve eccentrically mounted and means is associated with the sleeve whereby the moment tending to rotate the sleeve, due to the load being raised, may be indicated or may operate in the manner above stated.

For instance, the sleeve or other eccentric member may be associated with a pointer or index co-operating with a scale of a suitable character and with means adapted to balance the moment acting upon the eccentric member and thus enables the pointer or index to move over the scale in proportionate relationship with the moment.

Any convenient means may be employed for balancing the moment acting upon the eccentric member. For instance, the force of gravity may be utilized for the purpose in question, a weight being connected with the eccentrically mounted sleeve or other eccentric member by means of an arm. Alternatively, a spring may be employed as a balancing means.

The invention is capable of application to various rotatable members subjected to the action of the load to be raised.

Where the device is associated with a gantry crane, one end of the burden rope may be connected with a member mounted on an eccentrically mounted sleeve or other eccentric member, means being associated with the eccentric member whereby the turning moment imparted to it under the action of the load may be determined or may be utilized for preventing, deferring or interrupting the operation of the lifting device when the load exceeds a predetermined maximum.

Further, in accordance with the invention, the burden rope or chain or the stays, or guy ropes may be passed over a plurality of pulleys one of which is rotatably mounted upon an eccentrically mounted sleeve or other eccentrically mounted member.

In accordance with the invention, in the case of a jib crane or the like, the jib at a point remote from its outer end may be rotatably mounted on an eccentric member with which is associated means adapted to indicate the turning moment or which, alternatively or in addition, is adapted to prevent, defer, or interrupt the operation of the lifting device.

Alternatively, in the case of jib cranes or the like the pulley at the head of the jib or its equivalent may be rotatably mounted on an eccentric member which may be in the form of an auxiliary frame mounted on the jib and associated with means adapted to constrain its longitudinal axis to assume a determined relation with the axis of the jib.

In the case of jib cranes or the like means may be provided whereby the effect of the variations in the angle of inclination of the jib or the radius of lift upon the motion of the index or the like is cancelled out, in which case the device will function merely as a weighing device.

Where, however, the invention is applied to luffing cranes and the like adapted to operate at different radii, the means in accordance with the invention may be arranged to be influenced by the variation in the angle of inclination of the jib or the radius of the lift.

Further, in accordance with the invention, means may be provided whereby motion of the index under the action of the moment, is influenced by other factors, for instance those depending upon the strength of various elements of the lifting device, such as the crushing strength of the jib, the strength of the gearing, and the like, all of which factors are normally taken into consideration by the crane makers in determining the safe load of the lifting device when operated at different radii and may be referred to as factors determined by the makers' law.

Thus, in accordance with the invention, a fixed or movable cam element may be associated with the jib or its equivalent whereby variation in the radius of the lift will be caused to act upon the index member to influence the same in accordance with such other factors. For instance, a cam of suitable profile may be appropriately secured to a fixed portion of the crane and associated with the cam and pivotally connected with the jib or the like is a lever adapted to vary the tension or compression on the spring opposing motion of the eccentric member.

Alternatively, a cam member may be secured to the jib or the like so as to be capable of motion relative thereto, the cam element being in turn connected with some fixed portion of the device so that motion of the jib or the like to vary its inclination will impart motion to the cam and thereby cause the same to vary the tension or compression on the spring balancing the forces acting upon the eccentric member.

In one such construction of device in accordance with the invention, in order to facilitate securing the same in position on the jib of a luffing crane after dismantling, the pointer or index is pivotally connected to a casing adapted to be secured to the jib, a scale being provided on the casing to co-operate with the index or pointer and an operative connection between the pointer and the eccentric sleeve or the like is permanently associated with the casing and is connected at one end with a bell crank lever mounted in the casing and associated with a spring, one end of the bell crank lever being arranged to co-operate with a cam member also associated with the casing and provided with means whereby it may be connected with a fixed portion of the base of the crane, the cam optionally being provided also with a pointer co-operating with a second scale on the casing whereby in mounting the device on the jib the said pointer may be brought into a predetermined position on the scale.

In a further alternative a cam element pivoted to the jib may be arranged to move, in accordance with variations in the inclination of the jib or the like, a weight along an arm or beam functioning as a steelyard for balancing the force tending to rotate the eccentric member.

The invention will be described further in detail with reference to the accompanying drawings in which certain constructions in accordance with the invention are illustrated by way of example:—

Figure 1 being a side elevation of a jib crane furnished with one form of indicator in accordance with the invention, Figure 2 being a fragmentary view showing more clearly the indicating means as viewed from the cab, Figure 3 being a detailed view on an enlarged scale illustrating this construction, and Figure 4 is a fragmentary view of a second construction, Figure 5 being a similar view of a third construction;

Figure 6 illustrates a fourth construction;

Figure 7 illustrates a fifth construction;

Figure 8 is a fragmentary view of a sixth construction;

Figure 9 illustrates a seventh construction;

Figure 10 is a fragmentary view of an eighth construction;

Figure 11 illustrates a ninth construction, and

Figure 12 illustrates the application of the invention to gantry cranes.

In the drawings, 1 is the jib of a crane and 2 in the Figures 1, 6, 7, 9 and 10 indicates the cab to which the jib is secured.

In the constructions illustrated in Figures 1, 2, 3, 4, 5, 6, 7, 8 and 9, 3 is the chain pulley at the head of he jib over which the chain 4 passes and the pulley is mounted upon an eccentric sleeve 5, which in turn is mounted upon a spindle 6 rigidly secured to the jib head. The eccentric sleeve, in the case of the constructions illustrated in Figures 1, 2 and 3, is provided with an arm 7, connected by the rod 8 with means for constraining the sleeve to occupy a position such that regarded in elevation it stands with the longer axis of eccentricity nearly approaching the horizontal.

In the constructions illustrated in Figures 1 and 2, for constraining the arm to occupy this position, a spring 9 is provided and with the link 10, on the spring is associated, as may be seen from Figure 2, a pointer 11, adapted to move over the scale 12.

In the constructions illustrated in Figures 4 and 5, for constraining the sleeve to occupy the position above referred to, a weight 13 is employed, the weight being connected with the sleeve by means of the rod 14, the sleeve in the construction illustrated in Figure 4 being provided with a pointer 15 co-operating with the scale 16 secured to the jib.

In the construction illustrated in Figure 5, the arm 14 connected with the weight 13, is pivoted at 17 with the jib and is connected with the pointer 18 co-operating with the scale 19, the arm 14 also being connected by means of the link 20 with the arm 21 on the eccentric sleeve 5.

As will be understood, with the constructions illustrated in Figures 4 and 5 upon application of a load to the burden rope, the cam will rotate in an anticlockwise direction thus moving the weight member 12 outwards until a position of equilibrium is reached in which the couple exerted by the weight member is balanced by the moment of the eccentric sleeve about its axis, and in moving to the position of equilibrium the pointer connected with the weight member will be caused to move over its associated scale.

In the construction illustrated in Figure 6, the rod 22 pivoted to the arm 7 is connected with the arm 23 mounted upon a pivot 24 on the jib and provided with a pointer 25 co-operating with the scale 26, the pointer by means of the rod 27 being associated with a spring 28 which is arranged to bear upon one end of the arm 29 of a bell crank lever mounted upon the pivot 30 secured to the jib, the other arm 31 of the bell crank lever being provided at its extremity with a roller 32 co-operating with the cam member 33 located at the base of the crane.

In this construction variations in the angle of the jib will cause the roller 32 to move over the face of the cam 33 and thereby correspondingly cause variations in the tension of the spring 28 and hence variations in the magnitude of the couple opposing the forces acting on the eccentric sleeve due to tension in the burden rope.

In the construction illustrated in Figure 7, the rod 34 forms a connection between the eccentric sleeve and the crank 35 by means of the pin 36 on the rod engaging within a slot formed in the arm 37 of the crank, the other arm 38 of which constitutes an index co-operating with the scale 39. At the lower extremity of the rod 8 is located a spring 40 adapted to bear against the end 41 of a bell crank lever mounted on a fixed pivot 42 in the casing, the other end 43 of the bell crank lever co-operating with a cam 44 adapted, by means of the rod 45 connecting it with the cab or base of the crane, to be moved in varying the inclination of the jib. With the cam is associated a second index or pointer 46 adapted to co-operate with the scale 47. The cam is suitably formed to modify the motion of the index in order to compensate for factors, such as the crushing strength of the jib, the strength of the gearing, and the like, all of which factors are normally taken into consideration by the crane makers in determining the safe load of the lifting device when operated at different radii and may be referred to as factors determined by the "makers' law."

In the construction illustrated in Figure 8, the eccentric sleeve is connected by means of the rod 48 with one end 49 of a bell crank lever pivoted at 50 to a fixed point in the jib, the spring 51 on the rod 48 being adapted to bear against the arm 49 of the bell crank lever. To the other arm 52 of the bell crank lever is pivoted the roller 53 adapted to bear against the face of the cam member 54 to which is connected by means of the arm 55 a pointer 56 adapted to co-operate with the scale 57, the said pointer being connected by means of the rod 58 to the fixed portion of the cab.

In the construction illustrated in Figure 9, the arm 7 of the eccentric sleeve is connected to a flexible member 59 passing around a pulley 60 mounted upon the cab, the said flexible member being connected at 61 with the steelyard 62 upon which is slideably mounted a weight member 63 having a pin 64 projecting through a slot 65 formed in the lever 66. The lever 66 is pivoted at 67 to the frame member 68 secured to the cab and is provided at its lower extremity with a roller 69 adapted to engage the face of the cam member 70 pivoted at 71 to the jib, and having at its lower extremity 72 a pivotal connection with the rod 73 which rod is pivoted at 74 to a fixed portion of the cab, the pointer 62 being adapted to co-operate with a scale 75.

In the construction illustrated in Figure 10, the jib is mounted on a sleeve 76 so as to be freely rotated about the same on a ball or roller bearing 77 and the sleeve 76 is eccentrically mounted on the pin 78 to which is secured the double arm lever 79, one of which forms a pointer co-operating with the scale 80, while the other arm bears upon one end of the spring 81, the other end of which bears upon a washer 82 contacted with the nut 83 secured on the eye bolt 84 pivoted about the pin 85. The operation of this form of construction will be understood from the description of the operation of the constructions illustrated in Figures 1 to 6 which, in principle, it generally resembles.

With constructions in which the lower end of the jib is mounted on an eccentric member, also a cam or the like may be provided adapted to influence the safe load indicator or its equivalent in order to modify its action or introduce into its indications other factors than the weight of the load, namely, those above referred to as factors determined by the "makers' law".

Figure 11 illustrates a form of construction in accordance with the invention in which the load indicating means is associated with the elevating rope of the crane. In this construction, the burden rope 86 passes, respectively, over the pulley 87, the pulley 88 rotatably mounted upon the eccentric sleeve 89, and the pulley 90. Connected with the eccentric sleeve 89 is the pointer 91 adapted to co-operate with the scale 92, the pointer bearing against the head of a spring 93 abutting at its other end against the fixed point 94.

In the construction illustrated in Figure 12, the invention is applied to the measurement of loads on gantry cranes and the like. In this construction the burden rope 95 passes over the pulley 96 round the pulley 97 with which is associated the hook 98 to which the load is secured and is connected at 99 with the arm 100 of the eccentric sleeve 101 mounted upon the fixed pivot 102. Also associated with the eccentric sleeve 101 is the arm 103 bearing at its extremity upon the spring 104 and attached at its other end 105 to a fixed portion of the device. To the arm 103 is pivotally connected one arm of the bell crank lever 106 pivoted at 107 to a fixed portion of the device, the other arm of the bell crank lever being pivoted at 108 to the pointer 109 adapted to co-operate with the scale 110.

The invention not only extends to lifting devices comprising improved means designed to determine the magnitude of the load and adapted optionally, alternatively or in addition to operate to prevent, defer, or interrupt the operation of the lifting device when the safe load is exceeded but also to the means above specified for effecting such results.

I claim:

1. A lifting device having means adapted to ensure that the limits of safety shall not be exceeded comprising an eccentric adapted to rotate about its axis of eccentricity, a member subjected to the influence of the load rotatably mounted thereon, and means adapted to balance the forces tending to rotate the eccentric due to the action of the load being raised.

2. A lifting device having means adapted to ensure that the limits of safety shall not be exceeded comprising an eccentric sleeve mounted on a spindle and adapted to rotate about its axis of eccentricity, a member subjected to the influence of the load rotatably mounted on the eccentric sleeve, and means adapted to balance the forces tending to rotate the eccentric sleeve due to the action of the load being raised.

3. A lifting device having means adapted to ensure that the limits of safety shall not be exceeded comprising an eccentric sleeve mounted on a spindle and adapted to rotate about its axis of eccentricity, an index member actuated by the motion of the sleeve about its axis, a scale co-operating with said index, a member subjected to the influence of the load rotatably mounted on the eccentric sleeve, and means adapted to balance the forces tending to rotate the eccentric sleeve due to the action of the load being raised and to enable the index to move over the scale in proportionate relationship with the said forces.

4. A lifting device having means adapted to ensure that the limits of safety shall not be exceeded comprising an eccentric sleeve mounted on a spindle and adapted to rotate about its axis of eccentricity, a member connected with one end of the lifting rope and subjected to the influence of the load rotatably mounted on the eccentric sleeve and means adapted to balance the forces tending to rotate the eccentric sleeve due to the action of the load being raised.

5. A lifting device having means adapted to ensure that the limits of safety shall not be exceeded comprising an eccentric sleeve mounted on a spindle and adapted to rotate about its axis of eccentricity, an index member actuated by the motion of the eccentric sleeve about its axis, a scale adapted to co-operate with said index, a member connected with one end of the lifting rope and subjected to the influence of the load rotatably mounted on the eccentric sleeve and means adapted to balance the forces tending to rotate the sleeve due to the action of the load being raised and to enable the index to move over the scale in proportionate relationship with the said forces.

6. A lifting device having a luffing jib and means adapted to ensure that the limits of safety shall not be exceeded, said means comprising an eccentric sleeve upon which the said jib is rotatably mounted, an index member actuated by the motion of the eccentric sleeve about its axis, a scale adapted to co-operate with said index and means adapted to balance the forces tending to rotate the eccentric sleeve due to the action of the load being raised and to enable the index to move over the scale in proportionate relationship with the said forces.

7. A lifting device having a luffing jib and means adapted to ensure that the limits of safety shall not be exceeded said means comprising an eccentric sleeve mounted on a spindle and adapted to rotate about its axis of eccentricity, an index member actuated by the motion of the eccentric sleeve about its axis, a scale co-operating with said index, a member subjected to the influence of the load rotatably mounted on the eccentric sleeve and means adapted to balance the forces tending to rotate the eccentric sleeve due to the action of the load being raised and to neutralize the effect of variations in the angle of inclination of the jib upon the motion of the index.

8. A lifting device having a luffing jib and means adapted to ensure that the limits of safety shall not be exceeded said means comprising an eccentric sleeve mounted on a spindle and adapted to rotate about its axis of eccentricity, an index member actuated by the motion of the eccentric sleeve about its axis, a scale co-operating with said index, a member subjected to the influence of the load rotatably mounted on the eccentric sleeve and means adapted to balance the forces tending to rotate the eccentric sleeve due to the action of the load being raised and to influence the motion of the index under the action of the forces tending to rotate the eccentric sleeve by other factors than the forces tending to overturn the device.

9. A lifting device having a luffing jib and means adapted to ensure that the limits of safety shall not be exceeded said means comprising an eccentric sleeve mounted on a spindle and adapted to rotate about its axis of eccentricity, an index member actuated by the motion of the eccentric sleeve about its axis, a scale co-operating with said index, a member subjected to the influence of the load rotatably mounted on the eccentric sleeve, a spring adapted to oppose motion of the eccentric sleeve, due to the action of the load being raised, a cam secured to a fixed portion of the lifting device, a lever pivotally connected with the jib and associated with said cam adapted to vary the tension or compression of the said spring in order to neutralize the effect of variations in the angle of inclination of the jib upon the motion of the index.

10. A lifting device having a luffing jib and means adapted to ensure that the limits of safety shall not be exceeded said means comprising an eccentric sleeve mounted on a spindle and adapted to rotate about its axis of eccentricity, an index member actuated by the motion of the sleeve about its axis, a scale co-operating with said index, a member subjected to the influence of the load being raised, a cam secured to a fixed portion of the lifting device, a lever pivotally connected with the jib and associated with said cam adapted to vary the tension or compression of the said spring in order to influence the motion of the index under the action of the forces tending to rotate the eccentric sleeve by other factors than the factors tending to overturn the device.

11. A lifting device having a luffing jib and means adapted to ensure that the limits of safety shall not be exceeded, said means comprising an eccentric sleeve mounted on a spindle and adapted to rotate about its axis of eccentricity, an index actuated by the motion of the eccentric sleeve about its axis, a scale co-operating with said index, a member subjected to the influence of the load rotatably mounted on the eccentric sleeve, a spring adapted to oppose motion of the eccentric sleeve under the action of the load being raised, a cam member secured to the jib so as to be capable of motion relatively thereto, a lever pivotally connected at one end with the jib and at its other end with the said cam in such manner that motion of the jib to vary its inclination will impart motion to the cam thereby causing the same to vary the tension or compression on the spring balancing the forces acting upon the eccentric sleeve.

12. A lifting device having a luffing jib and means adapted to ensure that the limits of safety shall not be exceeded said means comprising an eccentric sleeve mounted on a spindle and adapted to rotate about its axis of eccentricity, a member subjected to the influence of the load rotatably mounted on the eccentric sleeve, a casing provided with a scale adapted to be secured to the jib, an index pivotally connected with the casing, and permanently associated with the casing a member secured to the eccentric sleeve and to the index adapted to be actuated by motion of the sleeve about its axis, a bell crank lever mounted in the casing, a spring located on the said member and co-operating with one arm of the bell crank lever adapted to balance the forces acting upon the eccentric sleeve due to the load being raised, a cam member located within the casing co-operating with the other arm of the said bell crank lever and a lever connected at one end with the said cam member and at its other end with a fixed portion of the base of the lifting device in such manner that motion of the jib to vary its inclination will impart motion to the cam and thereby cause the same to vary the tension or compression on the spring balancing the forces acting upon the eccentric sleeve.

13. A lifting device having a luffing jib and means adapted to ensure that the limits of safety shall not be exceeded said means comprising an eccentric sleeve mounted on a spindle and adapted to rotate about its axis of eccentricity, a member subjected to the influence of the load rotatably mounted on the eccentric sleeve, a casing provided with a scale adapted to be secured to the jib and an index pivotally connected with the casing, and permanently associated with the casing a member secured to the eccentric sleeve and to the index adapted to be actuated by motion of the sleeve about its axis, a bell crank lever mounted in the casing, a spring located on the said member and associated with one arm of the bell crank lever, a cam member located within the casing co-operating with the other arm of the said bell crank lever, a lever connected at one end with the said cam member and at its other end with a fixed portion of the base of the lifting device, a pointer connected with the said cam and a second scale on the casing adapted to co-operate with the said pointer whereby in mounting the safety means on the jib said pointer may be brought into a predetermined position on the scale.

14. Means adapted to ensure that the limits of safety of a lifting device shall not be exceeded, comprising an eccentric sleeve mounted on a spindle and adapted to rotate about its axis of eccentricity, an index member actuated by motion of the eccentric sleeve about its axis, a scale co-operating with said index, a member adapted to be subjected to the influence of the load rotatably mounted on the eccentric sleeve, and means adapted to balance the forces tending to rotate the eccentric sleeve due to the action of the load being raised and to enable the index to move over the scale in proportionate relationship with the said forces.

15. Means adapted to ensure that the limits of safety of a lifting device having a luffing jib shall not be exceeded comprising an eccentric sleeve mounted on a spindle and adapted to rotate about its axis of eccentricity, an index member adapted to be actuated by motion of the eccentric sleeve about its axis, a scale co-operating with said index, a member subjected to the influence of the load rotatably mounted on the eccentric sleeve, a spring adapted to oppose motion of the eccentric sleeve due to the action of the load being raised, a cam adapted to be secured to a fixed portion of the lifting device, a lever associated with said cam and adapted to be pivotally connected with the jib in such manner as to vary the tension or compression of the said spring in order to neutralize the effect of variations in the angle of inclination of the jib upon the motion of the index.

16. Means adapted to ensure that the limits of safety of a lifting device having a luffing jib shall not be exceeded comprising an eccentric sleeve mounted on a spindle and adapted to rotate about its axis of eccentricity, an index member adapted to be actuated by motion of the eccentric sleeve about its axis, a scale co-operating with said index, a member subjected to the influence of the load rotatably mounted on the eccentric sleeve, a spring adapted to oppose motion of the eccentric sleeve due to the action of the load being raised, a cam adapted to be secured to a fixed portion of the lifting device, a lever associated with said cam and adapted to be pivotally connected with the jib in such manner as to vary the tension or compression of the said spring in order to influence the motion of the index under the action of the forces tending to rotate the eccentric sleeve by other factors than the factors tending to overturn the lifting device.

17. Means adapted to ensure that the limits of safety of a lifting device having a luffing jib shall not be exceeded comprising an eccentric sleeve mounted on a spindle and adapted to rotate about its axis of eccentricity, an index member adapted to be actuated by motion of the eccentric sleeve about its axis, a scale co-operating with said index, a member adapted to be subjected to the influence of the load rotatably mounted on the eccentric sleeve, a spring adapted to oppose motion of the eccentric sleeve under the action of the load being raised, a cam member adapted to be secured to the jib so as to be capable of motion relatively thereto, a lever adapted to be pivotally connected at one end with the jib and connected at its other end with the said cam in such manner that motion of the jib to vary its inclination will impart motion to the cam thereby causing the same to vary the tension or compression on the spring balancing the forces acting upon the eccentric sleeve.

18. Means adapted to ensure that the limits of safety of a lifting device having a luffing jib shall not be exceeded comprising an eccentric sleeve mounted on a spindle and adapted to rotate about its axis of eccentricity, a member adapted to be subjected to the influence of the load rotatably mounted on the eccentric sleeve, a casing provided with a scale adapted to be secured to the jib, an index pivotally connected with the casing and permanently associated with the casing a member secured to the eccentric sleeve and to the index adapted to be actuated by motion of the eccentric sleeve about its axis, a bell crank lever mounted on the casing, a spring located on the said member and co-operating with one arm of the bell crank lever adapted to balance the forces acting upon the eccentric sleeve due to the load being raised, a cam member located within the casing co-operating with the other end of the said bell crank lever, and a lever connected at one end with the said cam member and at its other end adapted to be connected with a fixed portion of the base of the lifting device in such manner that motion of the jib to vary its inclination will impart motion to the cam and thereby cause the same to vary the tension or compression on the spring balancing the forces acting upon the eccentric sleeve.

19. Means adapted to ensure that the limits of safety of a lifting device having a luffing jib shall not be exceeded comprising an eccentric sleeve mounted on a spindle and adapted to rotate about its axis of eccentricity, a member adapted to be subjected to the influence of the load rotatably mounted on the eccentric sleeve, a casing provided with a scale adapted to be secured to the jib, an index pivotally connected with the casing, and permanently associated with the casing a member secured to the eccentric sleeve and to the index adapted to be actuated by motion of the eccentric sleeve about its axis, a bell crank lever mounted in the casing, a spring located on the said member and associated with one arm of the bell crank lever, a cam member located within the casing co-operating with the other arm of the bell crank lever, a lever connected at one end with the said cam member and adapted to be connected at its other end with a fixed portion of the base of the lifting device, a pointer connected with the said cam and a second scale on the casing adapted to co-operate with the said pointer whereby in mounting the safety means on the jib said pointer may be brought into a predetermined position on the scale.

In testimony whereof I have signed my name to this specification.

ARCHIBALD FRAZER NASH.